United States Patent [19]

Boisvert et al.

[11] Patent Number: 4,501,088
[45] Date of Patent: Feb. 26, 1985

[54] FLY TRAP WITH DISPOSABLE COLLECTOR

[76] Inventors: J. Roger Boisvert, 6638 Beeman Ave.; Samuel Schultz, 12619 Archwood St., both of North Hollywood, Calif. 91606; Robert Blaugrund, 510 Leslie La., Beverly Hills, Calif. 90210

[21] Appl. No.: 455,748

[22] Filed: Jan. 5, 1983

[51] Int. Cl.³ .............................................. A01M 1/10
[52] U.S. Cl. ......................................... 43/118; 43/122
[58] Field of Search ................. 43/107, 118, 119, 121, 43/122

[56] References Cited

U.S. PATENT DOCUMENTS

| | | | |
|---|---|---|---|
| 145,791 | 12/1873 | Eichholtz | 43/118 |
| 185,717 | 12/1876 | Belmer | 43/118 |
| 488,394 | 12/1892 | Jolitz | 43/118 |
| 1,012,566 | 12/1911 | Maire | 43/107 |
| 1,102,642 | 7/1914 | Brown | 43/118 |
| 1,269,623 | 6/1918 | Logsdon | 43/107 |
| 1,783,631 | 12/1930 | Sladky | 43/107 |
| 1,865,713 | 7/1932 | Taylor | 43/107 |
| 1,890,116 | 12/1932 | Jackson | 43/118 |
| 1,968,954 | 8/1934 | Metzger | 43/107 |
| 3,820,273 | 6/1974 | Novak | 43/113 |

Primary Examiner—Nicholas P. Godici
Assistant Examiner—Marc Hodak
Attorney, Agent, or Firm—Robert B. Block; Lewis Anten

[57] ABSTRACT

A multiple chamber fly trap contains approximately concentric screens defining a region within the inner screen into which the flies enter for the bait, an annular second region between the screens into which the flies enter to escape to the light, and a third region below the second region into which the flies drop after exhaustion. A plurality of openings between the consecutive regions allow passage of the flies from the first to the second to the third and into a removable collector which is preferably a disposable bag.

7 Claims, 8 Drawing Figures

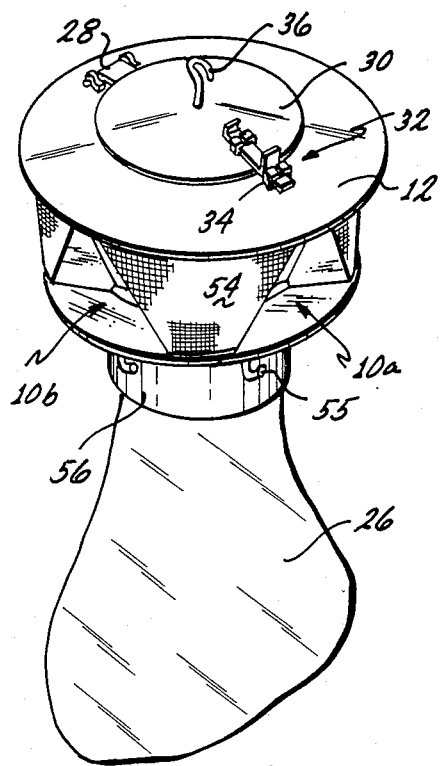
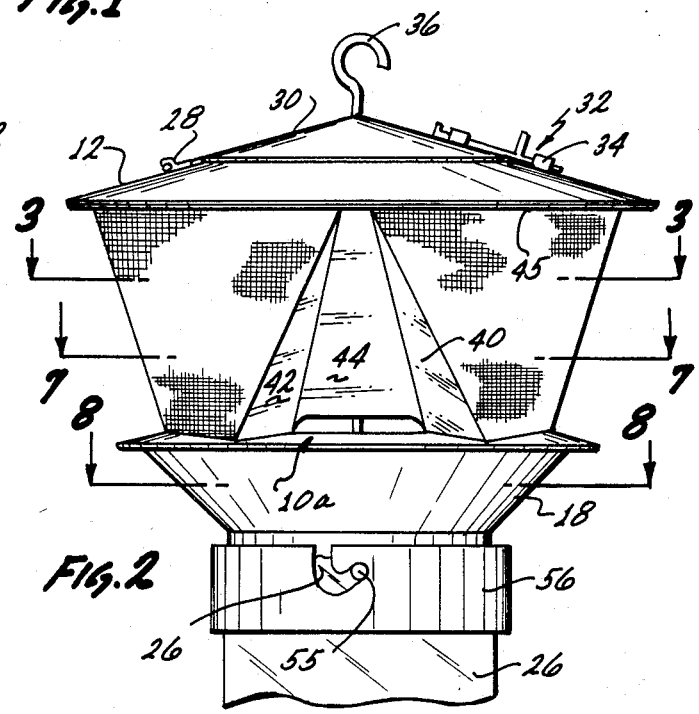
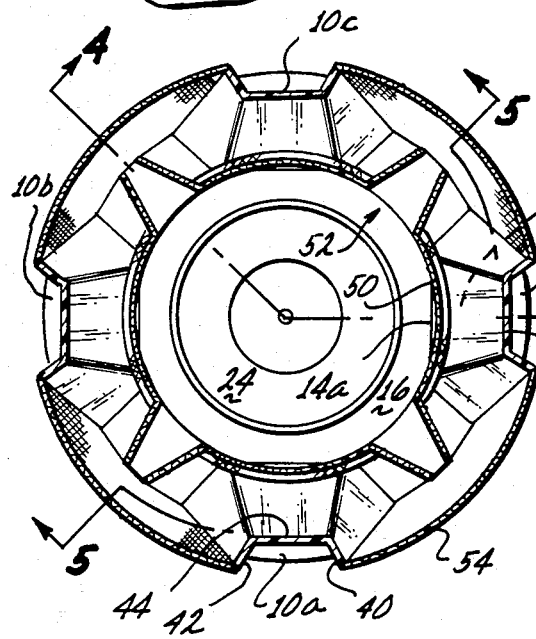
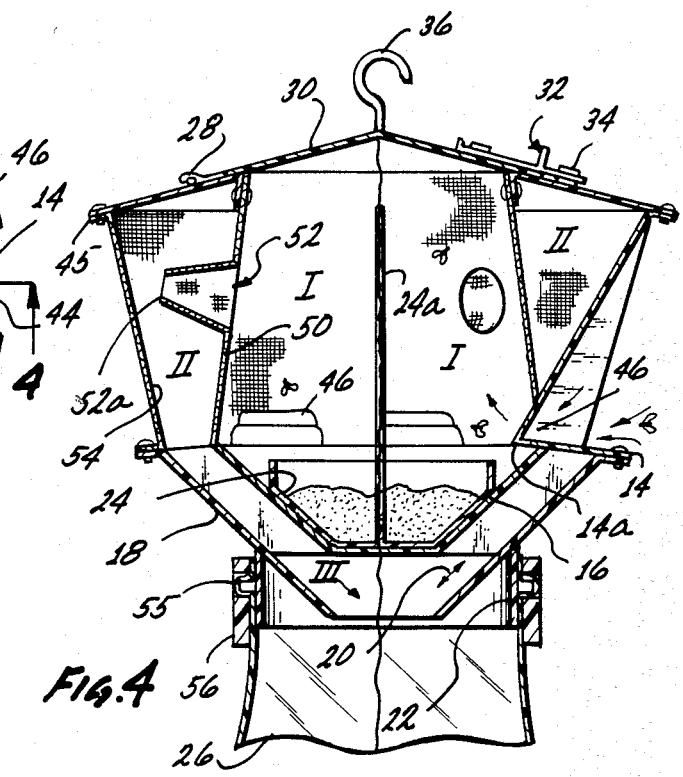

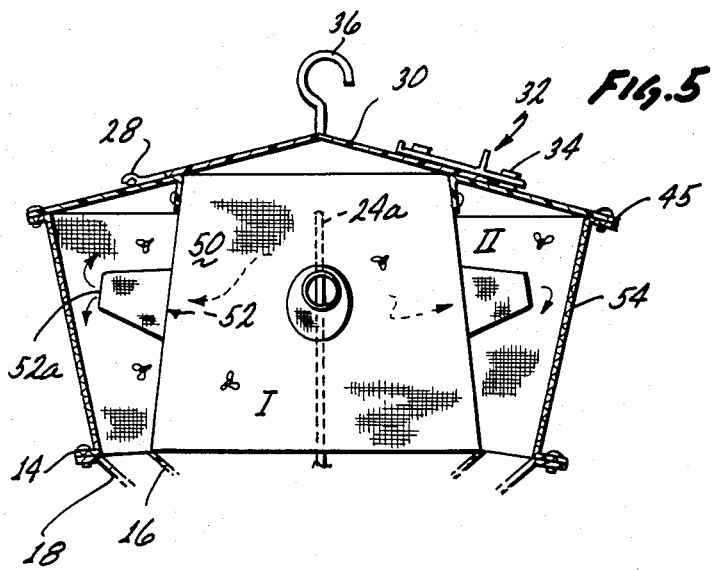
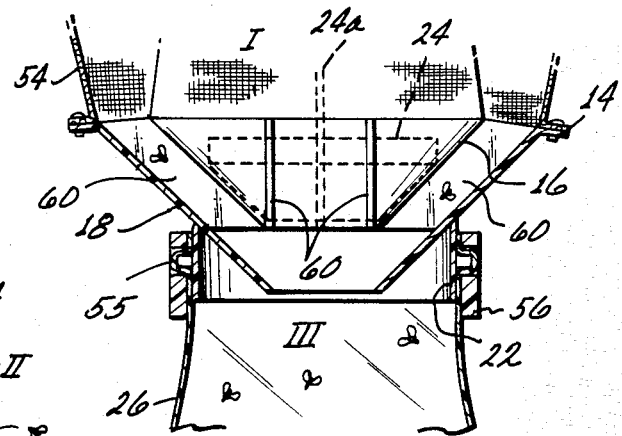
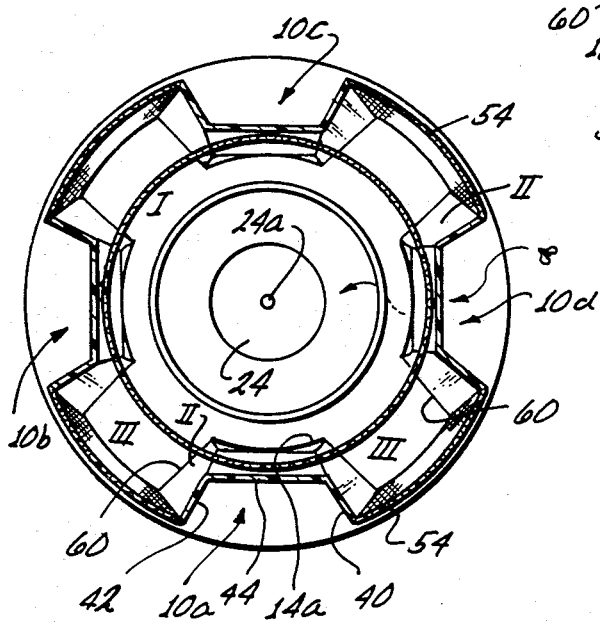
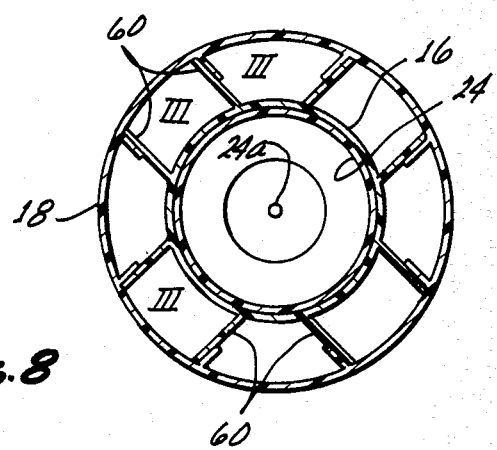

FLY TRAP WITH DISPOSABLE COLLECTOR

BACKGROUND OF THE INVENTION

This invention relates to fly traps and more particularly to fly traps of the type employing multiple chambers with inlets for admitting flies in search of food and for preventing their escape. The invention is found to be particularly effective in enticing curious, hungry flies to enter and provides an independent means of segregating and storing dead flies for disposal.

Previously, as in U.S. Pat. No. 3,820,273 fly traps have been proposed wherein a screened chamber contains a fly-attracting food and is entered through a port of restricted size. Once inside, the fly cannot fly back through the port and thus must remain to live within the trap for the remainder of a fly lifetime. This soon creates a collection of old dying flies in the trap, feeding still, and is difficult to handle and particularly difficult to empty. Furthermore, the accumulating dead flies are not attractive to curious newcomers. Multi-compartment traps of similar character have been known such as U.S. Pat. Nos. 145,791; 185,717; and 1,102,642 where provision was made for fed flies to find a means of escape from the food feeding region. Thus an outer second screened chamber was provided and entered through a port of limited size from the first chamber. The port was constructed to essentially prevent fly return. There was no escape from the second chamber. While this got dying flies away from the food, it still created a very visible pile of dead and dying flies surrounded by maggots in the bottom of the second chamber for all other flies to see, as well as becoming unattractive for the fly trap owner. Worse, these devices generally rested table top, somewhere in the vicinity, as for example of one's picnic table. There is, therefore, a need for a new and improved fly trap.

SUMMARY OF THE INVENTION AND OBJECTS

In general, it is an object of the present invention to provide a new and improved fly trap with a dead and dying fly disposal feature including a disposable collection element.

It is a further object of the invention to provide an improved fly trap of the above character which is designed for molded plastic construction.

It is a further object of the invention to provide a fly trap of the above character in which a disposable element can be formed from a plastic bag.

A further object of the invention is to provide a fly trap of the above character which is preferably of the hanging type.

A further object of the invention is to provide a fly trap of the above character in which the feeding of flies and the collection of dead flies is completely segregated in function and in space so that removal of dead flies and feeding of and replenishment of food occurs in different regions sufficient segregated that the same may be accomplished independently and without interference from trapped flies in adjacent regions.

In accordance with the present invention two effects are utilized which rely on the nature of the fly and cooperate to provide a much improved fly trap. Firstly, it is the object of any trap, no matter how difficult to clean, to be able to attract the maximum number of flies, to entrap the same and in order to do this, it must be as fly-attractive as possible. It has been found that by constructing the trap in three regions that its performance can be remarkably increased. Specifically, the present invention provides a central feeding region having an access through a port which is preferably of solid wall construction to provide relatively shielded and darkened porch. The port itself is preferably horizontally elongate and only sufficiently large to admit a walking fly to an internal precipice from which the fly may flit to the food. As the fly looks through the port the vision of the food and all predecessor feeding flies is enhanced by the general darkness of the solid wall of the entry and the contrasting lit area of food and feeding flies. The feeding region is screened thereabout to admit light and to release odors, but to entirely enclose fly movement. In a coaxial construction, a region II coaxial to the feeding region I is provided thereabout as by a second screened cylindrical or frusto-conical wall spaced from the feeding region screen. Access to region II is provided by ports through the feeding region screen so that a fly may exit, being attracted by the generally well lighted outdoors. Flies are known to fly from food in darkened quarters to available light and often impinge upon the flit about one's window for this reason. Once in region II, the well nourished fly finds further exit impossible and thus sets upon some small commotion to escape. However, the fly is no longer nourished and eventually wears out and drops of fatigue or exhaustion. The second region is without floor, however, so that any fly that drops falls into a third region (III) below the second region (II), which third region is a funnel leading to a collection bag.

In coaxial construction, the trap is relatively straight forward to construct although of moderately complex internal construction, but can still be made with a relatively small number of plastic parts. Provision is made for a hinged roof to enable removal of a feeding dish for cleaning and replenishment. The collection bag is secured to the bottom of the trap by a collet which is removable with a partial turn from a bayonet locking lug and is preferably of the totally disposable type so that a simple banding of the bag top is sufficient before throwing the same away and replacing it with a new bag. The bag may be made of perforated plastic to allow drying air to circulate and prevent stagnant accumulation of moisture in the dead fly pack, thus eliminating maggots.

These and other features and objects of the invention will become apparent from the following description and claims taken in conjunction with the accompanying drawings of which:

BRIEF DESCRIPTION OF THE DRAWINGS

FIG. 1 is a perspective view from above showing the fly trap constructed in accordance with the present invention.

FIG. 2 is a side elevational view of the fly trap of FIG. 1.

FIG. 3 is a cross-sectional view taken along the lines 3—3 of FIG. 2.

FIG. 4 is a cross-sectional view taken along the lines 4—4 of FIG. 3.

FIG. 5 is a cross-sectional view of region II taken along the lines 5—5 of FIG. 3.

FIG. 6 is a cross-sectional view of region III taken along the lines 5—5 of FIG. 3.

FIG. 7 is a cross-sectional view taken along the lines 7—7 of FIG. 2.

FIG. 8 is a cross-sectional view taken along the lines 8—8 of FIG. 2.

DETAILED DESCRIPTION OF THE PREFERRED EMBODIMENT

Referring to FIGS. 1, 2, and 4 the fly trap of the present invention is shown constructed in a coaxial format which is axially symmetric and convenient to manufacture. As a coaxial construction, the trap has several openings which are directed all around so that it can be approached from any direction. Thus, the trap includes a plurality of sheltered entries 10a, b, c, d which serve as balconies or porches and together collectively support the roof 12. A balcony floor 14 lies coaxially around and above and a pair of central, interior sub floors 16 and 18. The interior floors 16,18 are generally frustro-conical in shape, converging downwardly, and spaced to define a conical chute 20 opening into a cylindrical collar 22 at the bottom side of floor 18.

The interior of the fly trap is divided into a central interior chamber to define region I and an exterior screened region coaxial with the first region and spaced therefrom to define a second chamber or region II. The floor 16 is tapered downwardly and serves as a rest for a food dish 24 which is provided with an upstanding stem for removal. Region III is partially defined by the frustro-conical chute developed between sub floors 16 and 18 and empties into a collection bag 26 as will be further described.

The roof 12 is preferably be of peaked construction to facilitate runoff of rain water and thus in conical construction it is a cone. The central portion of the cone including the apex is constructed as a separate part overlapping the lower portion of the cone and is hinged at one side (28) to form an openable hatch cover 30. A sliding bolt 32 secures the side of the hatch cover opposite from the hinge so that can be opened as an access to the food tray. A unified structure of these parts is formed when the slide bolt 32 of the latch is engaged with the closed part 34 fastened to the lower section of the roof. A hanger is attached or formed to arise from the apex of the conical hatch and loops into an open hook 36 for hanging the entire trap as from a tree branch or hanging line.

The portico to region I is defined by three triangular walls 40, 42 and 44 which converge at the roof and are joined thereto at an uppermost lip 45 as by rivets, which may be used throughout if constructed in metal. As the walls diverge, the lateral wall opens laterally outward and the inner wall diverges inwardly and joins to floor 14 to define an entry. An elongate bar opening 46 (FIG. 4) is formed at the lower most part in the rear wall and is just high enough for a fly to walk through. These walls join to meet the floor 14 of the porch or balcony and thereby provide semi-enclosed structure. The floor 14, the balcony side walls and the roof are joined together so that the several entries, 10a, b, c and d including the floor and roof are joined into a unitary structure. The floor 14 at the elongate opening from the entry 10a with the fly trap is arranged to overlap and extend beyond the outer perimeter of the inner floor 16 so that the shelf there provided is a suitable vista for the fly to get a commanding view of the food and feeding flies inside the trap.

However, once the fly succumbs to the temptation and flits into the trap, the fly is no longer in an advantageous position for finding this entry as an egress since, from its lower aspect, the fly must walk across the difficult juncture between the inner floor and the bottom of the entry balcony floor which involves a reentrant angle and then must crawl over the edge from which it previously flit. Flies have six coordinated legs but are not known to crawl over edges. They fly over them. Here such a crawling exit is arranged to be most difficult for the fly even if the fly intelligence were such as to perceive its necessity since the fly almost has to crawl over the edge at 14a and upwardly in order to successfully crawl out opening 46. Such motion apparently does not come easily to flies, for as yet, no fly has been seen to re-emerge from the trap shown.

The food dish 24 may be of any simple sort but preferably has a conical side wall and flat bottom so as to be stably supported on the conical inner floor 16 of the trap. The food can be replaced by lifting on the lifting stem 24a and may be taken through the hatch cover for cleaning and food changing. As is shown, region I containing the food is isolated from region II by the interior screen wall 50 so that opening the cover and changing the food does not involve exposing oneself to a swarm of anxious flies contained within region II or the heap of dying flies in region III.

Once the fly has fed it is natural for the fly to attempt to escape to the light and therefore it flies upwardly and lands on the screen wall 50 separating regions I and II. Shortly the fly finds that it can proceed towards the light through any of the fly ports 52 which start as openings in the screen wall and converge as a funnel with a small opening 52a into region II. This structure is best seen in FIGS. 3 and 4 and is frustro-conical in shape with the opened apex end of the cone extending into region II. Again, once the fly has entered region II its return is substantially impeded by the size of the opening at 52a and by the necessity of crawling around the sharp edge of this opening, a feat not easy for fly feet.

Region II is defined on the inside by the conical screen separating regions I and II and on the outside by the outer screen wall 54 intermittently formed between the entry porches 10. Thus, region II is continuous around and coaxially surrounds region I intermittently to form a significantly visable external aspect of the trap. After the fly enters region II, it is well fed but has no means of escape. Thus it proceeds to set up some fly commotion and to preen itself. Eventually some fly anxiety arises which causes the flies to be busy flying and flitting in region II and on display for all their fly friends to see. This results in a significant attractive nuisance to other flies in the vicinity who come to see what's good about the situation in the trap. Eventually, flies in region II become fatigued, wear out or die after falling from exhaustion or death to the bottom of Region II. Region II has no floor, but leads by openings provided thereabout directly into the chute to region III and the dead, dying and exhausted flies drop into the collection bag leaving only the attractive vital flies to remain in Region II.

The collection bag 26 is attached by a suitable structure to the trap at its lowermost region as by providing the downwardly extending collar with connection pins 55 to which a collet 56 is connected to form a bayonet screw structure for rapid engaging and disengaging of the bag 26 in the space between the collet and the collar. The bag can be of any sort, however, it is preferred that it be relatively accurately made for containment and that it be porous such as porous craft paper or of plastic perforated with small holes to provide adequate ventilation and drying of the dead fly pack within the bag.

The entry porch floor 14 is preferably tilted downwardly and outwardly and is also in a frustro-conical shape so that it is an easier landing perch for the fly. This shape also allows rain to drip away and to run outwardly and away from the trap. A particularly hard, slanted rain may cause water to drip through the fly entry openings, but even that will fall onto the inclined floor 16, run under the dish and drain through drain holes which may be provided in floor 16 and the bag rather than flood the food dish.

In operation, the fly trap of the present invention has been found extremely effective. The rate of fly attraction and entry for the first few flies is typical of fly traps and somewhat slow. But once a few flies accumulate in region II, their appearance to flies in the neighborhood is quite attractive and flies come to the trap in droves. It is believed that this is due principally to the ability of the trap to exit dying flies out of region II before they become a liability. The trap is very easy to clean compared to prior traps, since dead flies do not normally accumulate anywhere in the trap. As has been stated anything capable of free fall is discharged from region II straightforwardly through the floor. Anything in region I that is not removed with the food dish likewise discharges through the floor 16 drains. The bag itself can easily be removed by unsnapping the collet and removing it from the neck of collar. If the bag is sized appropriately, it can be easily banded at its upper end so that its dead fly contents are secure from spillage.

FIG. 5 emphasizes and illustrates the structure of region II showing the effect of its being bounded by inner and outer screen walls which are both needed for light to enter region I for the fly to see food and feeding flies and also needed to draw fed flies to the light and into region II after feeding.

FIGS. 6 and 8 show the structural arrangement of region III. As shown a plurality of walls are provided to form channels between the openings in the floor of region II and the collection bag. These walls define a labyrinth for occluding or blocking out fly return over a substantial segment of the possible return path to region II as seen from the collection end. Thus, any fly proceeding on a path between the walls lying below an entry finds a blind and cannot get out.

While the trap of the invention is readily constructed in sheet metal and wire screen, it can also be made for mass production in a few pieces of plastic molded parts since there are more than one plane of symmetry along which a part line can be taken.

What is claimed is:

1. A fly trap comprising first screen means forming a generally vertical outer wall,
   second screen means forming a generally vertical second wall concentrically disposed within said first wall to thereby define a central region (I) surrounded by generally annular region (II), means forming a plurality of openings about and through the surface of said vertical second wall for flies to migrate from region (I) to region (II), roof means connecting and covering said first and second screen means at their upper ends, floor means interconnecting and closing the bottom ends of the screen means and having a plurality of openings therein positioned about and through the bottom of region II to provide a egress for falling flies, means including floor means forming a plurality of inlet porches constructed to provide insect entry from the outside of the outer wall through the inside of the inner wall said porches including tapered walls which diverge downwardly into full contact with the floor means and converge to form a fly entrance at the inner wall on which and through which the flies enter from the outside into the central region (I), means for receiving a fly attractant in said central region (I), said tapered walls also forming within region I interior walls which converge towards the lower openings, said inner and outer walls and porch walls being significantly more vertical than the angle of repose of dead flies, said outer wall, inner wall and roof, together with porch walls, defining a generally annular region encircling the first region about a substantial vertical extent thereof, said annular region being horizontally continuous about the first region except where interrupted slightly at the lower extreme by porch walls so that well fed flies in region I are attracted to region II by the light, air and flies flitting about in region II to enter into that region from the region I, and flies outside the trap are attracted by the attractant and by the sight and noise of flitting flies in region II, the latter being able to encircle the region I in their general activity, the supply of flies in region II being continually replenished from region I and being kept fresh and moving by attrition of the tired, falling flies which are readily and directly removed by falling through the floor openings, chute means connected to the floor openings and depending downwardly to form a third region III in the shape of a downwardly convergent walls lying below the floor and forming a slide for dead and dying flies, means forming a removable container for receiving the dead and dying flies and connected to the lowermost end of the chute.

2. A fly trap as in claim 1 in which said first screen means is provided in the shape of an inverted upward frustrum of a cone opening upwardly and in which said second screen means is formed in the shape of an inverted frustrum of a cone symetrically aligned on a common axis with said first screen means, whereby walls between them derive a shape for region II which defines a downwardly convergent annular shape for said region II.

3. A fly trap as in claim 1 further including labyrinth means at least partially intersecting the fly return path in the chute of region III.

4. A fly trap as in claim 1 further in which said inlet porches include walls for shading said entry and shielding the same from extraneous light so that an entering fly has a clear view of interiorally lit food within.

5. A fly trap as in claim 1 in which said entry is wider than it is high and substantially wider than a fly wing span, said entry having an enlarged unilaterally extending floor bounded above and below by lateral walls converging towards said opening, said floor tilting upwardly toward said opening to facilitate rain run-off.

6. A fly trap as in claim 1 further in which said roof has a lateral extent covering the entire fly trap and made of solid material formed with a downwardly sloping conical shape to facilitate rain run-off.

7. A fly trap as in claim 6 in which said roof is provided with an opening therein for access to region I and a hatch cover for closing the opening, means for removably attaching the hatch cover to said roof.

* * * * *